(No Model.) 2 Sheets—Sheet 2.

W. A. BOYD.
MACHINE FOR SPLITTING CARCASSES OF ANIMALS IN HALVES.

No. 556,956. Patented Mar. 24, 1896.

Witnesses:
C. W. Graham
H. J. Orler

Inventor
Willard A. Boyd
by W. E. Williams
Atty.

UNITED STATES PATENT OFFICE.

WILLARD ALBION BOYD, OF CHICAGO, ILLINOIS.

MACHINE FOR SPLITTING CARCASSES OF ANIMALS IN HALVES.

SPECIFICATION forming part of Letters Patent No. 556,956, dated March 24, 1896.

Application filed March 1, 1894. Serial No. 501,911. (No model.)

*To all whom it may concern:*

Be it known that I, WILLARD ALBION BOYD, a citizen of the United States, residing at Chicago, county of Cook, and State of Illinois, have invented a new and useful Improvement in Machines for Splitting Carcasses of Animals in the Art of Slaughtering and Packing Meats, of which the following is a specification.

The object of my invention is to produce a machine which will automatically split in halves the carcasses of animals along the line of the backbone; and the invention consists in the devices set forth in the claims hereof.

Reference will be had to the accompanying drawings, in which—

Figure 1:
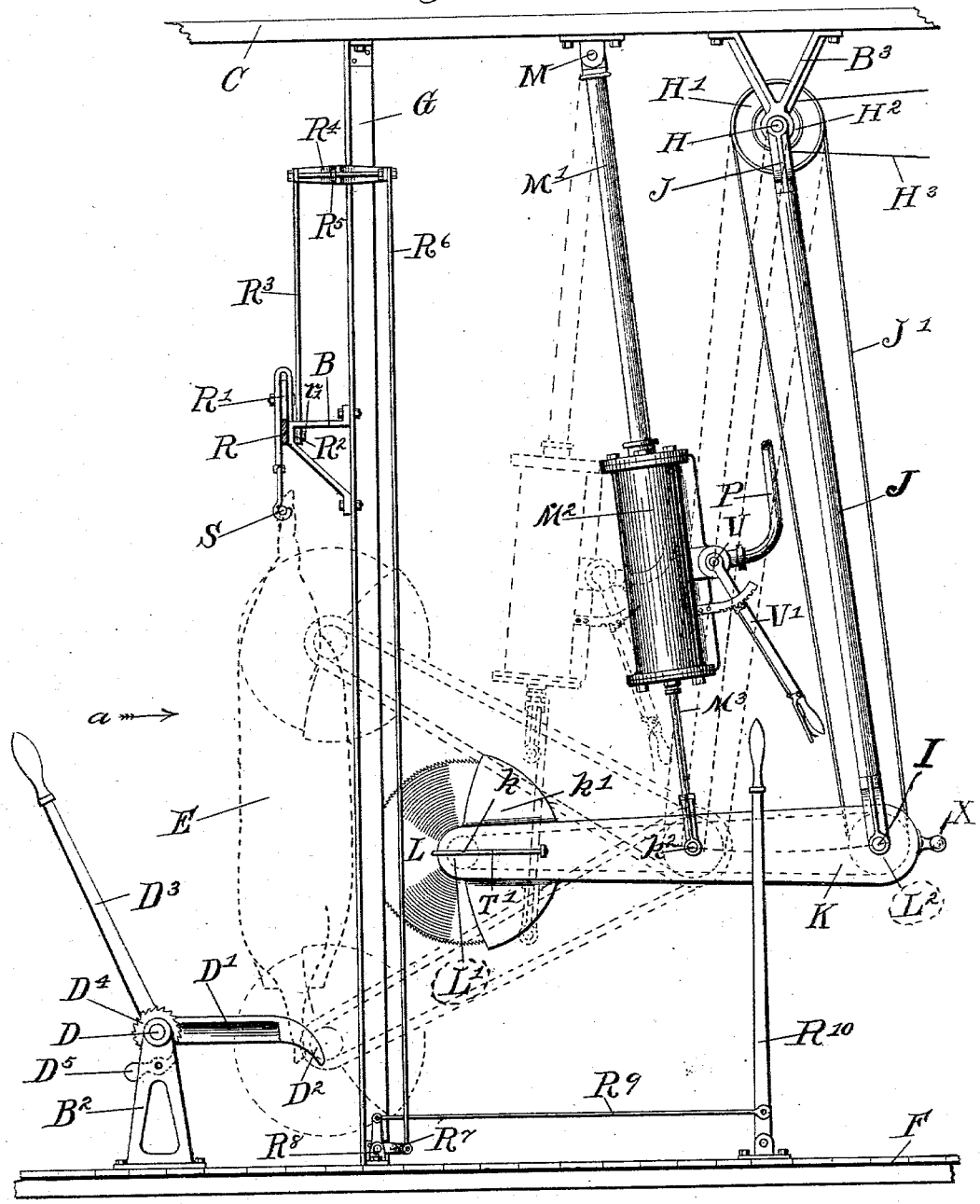
Figure 2:
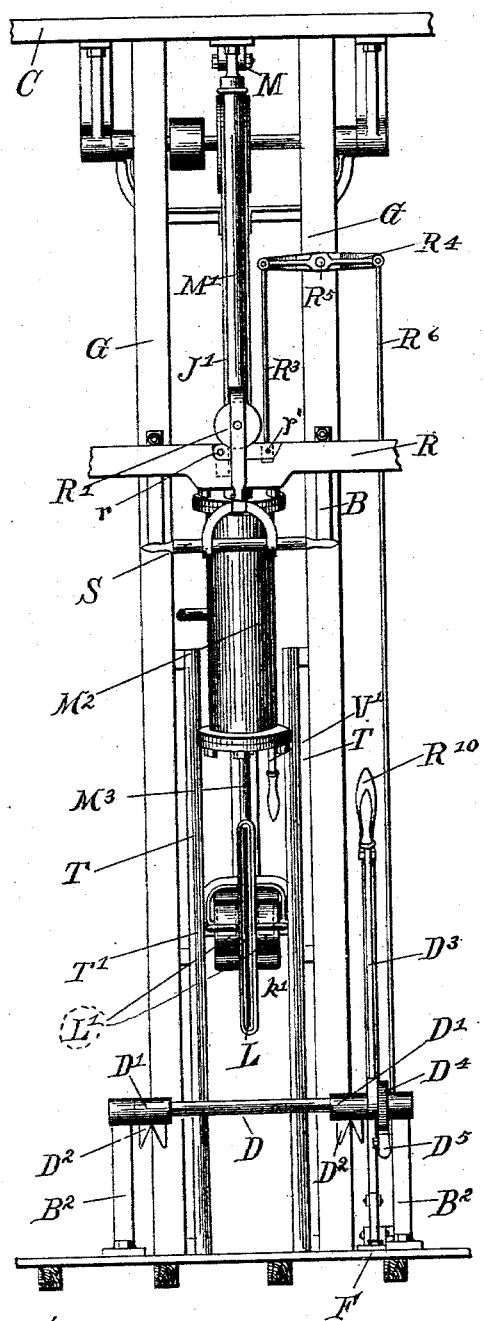
Figure 3:
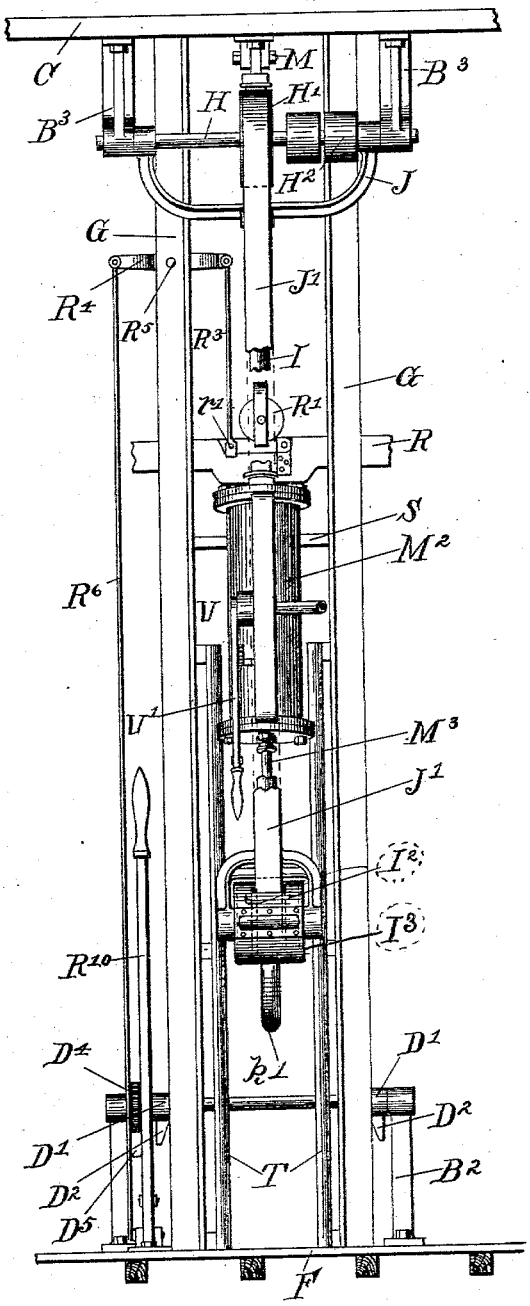

Figure 1 is a side elevation of my invention. Fig. 2 is a front elevation, looking in the direction of the arrow $a$. Fig. 3 is a rear elevation, looking in the opposite direction from that of Fig. 2.

In the drawings, F designates the floor of the building, and C the upper supporting-framework. In practice ordinarily the ceiling of the room serves instead of the frame C. Extending from the ceiling to the floor are two guide pieces G G, which are here shown as made of bars of angle-iron fixed to the floor F and ceiling C. On the front side of the bars G G, in brackets B B, is supported a rail R, which is the ordinary trolley-rail used in packing-houses, on which, by a trolley R', the carcass is carried along through the several stages of dressing in a manner well understood by those acquainted in the art. Opposite the center of the guides G G in the rail R there is made a notch or depression sufficient to stop the trolley R' at that point as it rolls along on the rail R by the force of gravity in the ordinary manner. The carcass E, supported from the trolley R' and connected thereto by a stick S, is brought to a standstill in position in front of the guides G G by means of the notch above described, the back of the carcass being on the side shown by the arrow $a$, Fig. 1. Supported in brackets $B^2$ is a rock-shaft D, carrying arms D', having forked ends $D^2$, which ends are made of a shape similar to the claws of a claw-hammer. Fixed on this shaft D there is an actuating-lever $D^3$ and a ratchet $D^4$. Fixed to one of the brackets $B^2$ there is a pawl $D^5$, which engages the teeth of the ratchet, and thereby holds the rock-shaft D in position, that the arms D' may not lift without disengaging the pawl from the ratchet. The lower limbs of the carcass are engaged in the claws $D^2$, and the lever $D^3$ is shoved forward by the attendant, thereby producing a strain on the carcass to hold the same in position during the cutting.

In brackets $B^3$, fixed to the ceiling C, is supported a horizontal shaft H, on which is pivoted a swinging frame J, supporting on its lower end a shaft I, on which is pivoted a vertically-oscillating arm K, on the outer end of which, in bearings $k$, is carried a circular saw L. The arm K is made of a hollow casing, the outer end of which is made in a form to serve as a guard for the saw-blade, as shown by $k'$, and through the interior of the arm K passes the belt which drives the saw L.

Pivoted to the ceiling at M is a bar M' supporting a pneumatic lift $M^2$, the piston-rod $M^3$ of which is pivoted at $k^2$ to the arm K. The pneumatic lift $M^2$ is supplied with compressed air, or a substitute therefor, by a pipe P and is provided with a valve V, having an operating-handle V', and valve V is so constructed that by it the piston of the lift may be moved up or down or held in position, as the operator desires.

The saw $L^2$ is driven by two band-wheels L', driven by belts from pulleys I' on the shaft I, driven by a pulley $I^3$, driven by a belt J' from a pulley H' on shaft H, which shaft H is driven by a pulley $H^2$, driven by a belt $H^3$ from the source of power.

Pivoted to the rail R at $r$ is a block $R^2$, which is pivoted at $r'$ to a link $R^3$, pivoted to a lever $R^4$, pivoted at $R^5$ to guide G and connected by link $R^6$ to a bell-crank $R^7$, pivoted at $R^8$ to a block on the floor and connected by a link $R^9$ to a hand-lever $R^{10}$, whereby the operator may lift the block $R^2$, and with it the trolley-wheel R', out of the depression in the rail R and give it an impetus of movement down the inclined rail R, thereby removing the carcass from the machine on completion of the cutting.

On the inside of the posts G G there are two guide-bars T T, and on the sides of the arm K there are two rods T', which, in contact with the guide-bars T, hold the end of the arm K from swinging laterally during the cutting.

The operation of the machine is thus: The carcass comes down on the trolley R' on the rail R and is stopped by the notch in the rail in front of the machine. The attendant immediately engages the lower limbs of the carcass in the ends $D^2$ of the arms D' and then shoves forward on the lever $D^2$, thereby producing a downward strain on the carcass, and thus holding the same in position. The operator with one hand on the lever V' and the other on the handle X pushes the arm K forward to bring the saw L in contact with the carcass. He then operates the valve V, which causes the arm K to descend, the swinging frame J at the same time moving to cause the saw to follow the contour of the carcass. The saw splits the carcass in halves, as is shown by the movement from the upper dotted position of the saw and arm in Fig. 1 to the lower dotted position in said Fig. 1. On the completion of the cutting the operator withdraws the saw and arm by the handle X, reverses the valve V and returns the saw to position ready for the next cut. In the meantime the attendant disengages the pawl $D^5$ from the ratchet $D^4$, and thereby loosens the arms D' from the connection with the carcass, and by the lever $R^{10}$ actuates the block $R^2$, lifting the trolley out of the notch in the rail R and starts it with the carcass onward and away from the machine, as before described.

The upper part of the carcass is held in position with respect to the machine by the stick S, which is carried by the trolley, which rests in the notch of the rail R. The rock-shaft D, with its arms D' separated from each other on the shaft D, steadies and holds the lower part of the carcass in position and holds its sides open to facilitate the cutting. The cylinder $M^2$ is so connected with the valve D as to positively move the piston of the cylinder up or down, as desired, under complete control of the operator.

The labor of splitting carcasses in halves in packing-houses has been done by hand in so far as my knowledge extends.

What I claim is—

1. In a machine substantially as described, the combination with a swinging frame, of a vertical swinging arm connected thereto, a vertical guideway, guiding the vertical movement of the said swinging arm, and mechanism for holding a carcass in position to said guideway.

2. The combination with a track and a carcass-supporting trolley thereon, of a stop arranged to arrest the trolley at a fixed point, carcass-seizing devices arranged below said point, to move from the arrested trolley, and cutting devices mounted to swing vertically and horizontally in approximately the medial plane of a carcass held by said trolley and seizing devices; whereby a carcass moving along the track may be arrested, strained longitudinally to produce comparative rigidity, and then cut in halves.

3. The combination with devices arranged to hold at one end each half of an undivided carcass, of devices arranged to seize each half at the opposite end and move from said holding devices, to produce comparative rigidity of the carcass, cutting devices mounted to swing in approximately the medial plane of the carcass so held, and means for actuating said cutting devices; whereby the carcass may be neatly and quickly split in halves.

4. The combination with a track and a carcass-supporting trolley thereon, of stop devices arranged to arrest said trolley and hold it at a predetermined point, a saw mounted to swing horizontally and vertically in approximately the medial plane of a carcass supported by the arrested trolley, means for imparting a cutting motion to said saw, and means for swinging it during said motion; whereby a carcass being conveyed in the usual manner may be split in transit.

5. In a machine substantially as described, the combination with devices for supporting a carcass in a position to be split; of arms D' located upon a shaft and provided with ends adapted to engage the carcass and steady the same; and mechanism for moving and locking the said shaft whereby the said engaging ends of said arms may be adjusted to the carcass and steady the same substantially as shown.

In witness whereof I have hereunto subscribed my name on this 15th day of February, 1894.

WILLARD ALBION BOYD.

Witnesses:
C. W. GRAHAM,
H. F. J. PORTER.